United States Patent
Reding et al.

[19]

[11] Patent Number: 5,812,657
[45] Date of Patent: Sep. 22, 1998

[54] TELEPHONE NUMBER DATA INPUT METHODS AND APPARATUS

[75] Inventors: Craig Reding, Midland Park, N.J.; Suzi Levas, Yorktown, N.Y.

[73] Assignee: Nynex Science & Technology, Inc., White Plains, N.Y.

[21] Appl. No.: 712,479

[22] Filed: Sep. 5, 1996

[51] Int. Cl.⁶ .............................. H04M 1/64; H04M 3/42; H04M 3/00
[52] U.S. Cl. .............................. 379/242; 379/67; 379/88; 379/89; 379/214; 379/216; 379/242; 379/260; 379/267
[58] Field of Search ................................ 379/67, 88, 89, 379/216, 242, 214, 260, 267

[56] References Cited

U.S. PATENT DOCUMENTS

| | | | |
|---|---|---|---|
| 4,817,129 | 3/1989 | Riskin | 379/88 |
| 4,839,919 | 6/1989 | Borges et al. | 379/96 |
| 5,272,749 | 12/1993 | Masek | 379/216 |
| 5,479,494 | 12/1995 | Clitherow | 379/144 |

Primary Examiner—Fan S. Tsang
Assistant Examiner—Allan Hoosain
Attorney, Agent, or Firm—Michaelson & Wallace; Peter L. Michaelson; Michael P. Straub

[57] ABSTRACT

Methods and apparatus for inputting telephone number information into an operator workstation are described. In accordance with the present invention, telephone number information may be entered as either alphabetic information using, e.g., the alphabetic keys on an IBM compatible keyboard, or as numeric information using the numeric keys on the keyboard or on a standard telephone keypad. When telephone number information is input as alphabetic information, the workstation automatically converts the alphabetic character of e.g., a vanity telephone number such as "SKYTELL" into the actual numeric 759 8355 which is then used to complete the call. Error checking is performed as part of the data input and conversion process. If an operator attempts to enter the letters Q or Z into a telephone number field or enters a key other than an alphanumeric the input data is rejected and an error message is sent to the operator. The present invention reduces the number of operator errors associated with the servicing of calls involving vanity numbers while at the same time reducing the amount of time required to service the call involving the vanity number.

22 Claims, 3 Drawing Sheets

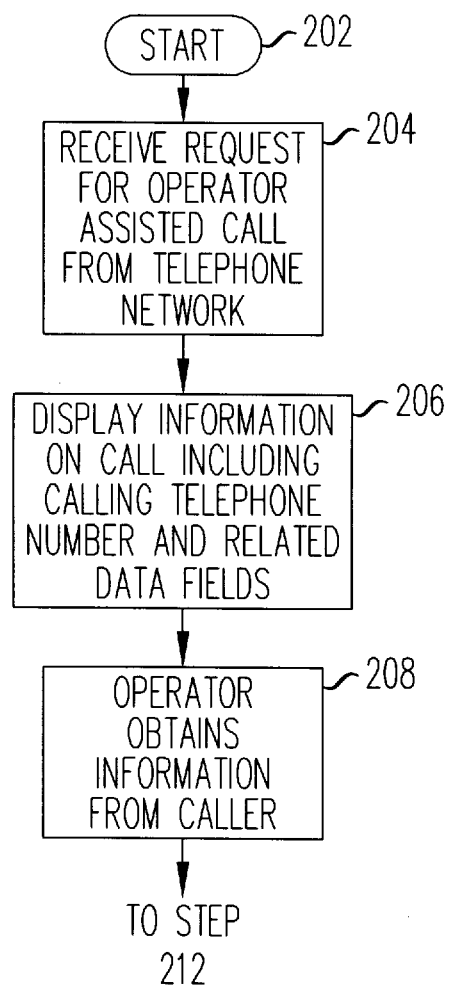

TELEPHONE NUMBER DATA INPUT METHODS AND APPARATUS

FIELD OF THE INVENTION

The present invention relates to the input of data into communication systems and, more particularly, to methods and apparatus for supporting the input of telephone destination information, e.g., telephone numbers, as either alphabetic or numeric data.

BACKGROUND OF THE INVENTION

Computer systems have become an integral part of providing communication services, e.g., telephone services. They are frequently used by telephone operators, e.g., to complete operator assisted telephone calls.

During an operator assisted telephone call, a caller will frequently request that an operator place a call to a destination which the customer identifies using a string of alphabetic characters, e.g., "SKYTELL". Telephone numbers which include alphabetic characters are frequently referred to as vanity numbers.

Keys on standard telephone keypads bear the following numeric designation and corresponding alphabetic designation.

TABLE I

| Key Number | Corresponding Alphabetic Characters |
|---|---|
| 2 | ABC |
| 3 | DEF |
| 4 | GHI |
| 5 | JKL |
| 6 | MNO |
| 7 | PRS |
| 8 | TUV |
| 9 | WXY |

Note that all letters of the alphabet are represented with the exception of the letters Q and Z. Also note that the "0", "1", "*", and "#" keys do not correspond to any alphabetic characters.

In order to enter a vanity number into a telephone system, e.g., computerized operator workstation, presently, operators have to input the number using a keypad which corresponds to that of a standard telephone. Accordingly, to input a vanity number, operators now have to convert the alphabetic characters of a vanity number into actual numeric telephone values which can then be entered using one of eight keys bearing the numbers 2–9.

For example, operators now need to convert alphabetic strings, such as "SKYTELL", into there corresponding numeric representation, e.g., 7598355, which can then be entered using a numeric or standard telephone keypad.

The need to convert alphabetic characters into numeric characters as discussed above increases the amount of time required for an operator to complete a call transaction as compared to telephone transactions where the operator is provided an actual numeric telephone number. In addition, the operator error rate associated with such telephone calls tends to be higher than with calls where the operator is provided a numeric telephone number. Such operator errors have the unfortunate consequence of resulting in misdirected calls and wasted telephone resources.

Unfortunately, from the perspective of telephone companies and operators, the use of alphabetic character strings to represent telephone numbers is increasing. This is largely the result of business advertising and the increased use of vanity numbers.

Because of the data entry problems associated with vanity numbers, there is a need for a method and apparatus which permits the entry of a destination telephone number as a string of alphabetic, numeric or a combination of alphabetic and numeric characters. There is also a need for automatically converting the alphabetic characters input into a telephone system into numeric information which can then be used to complete a call transaction.

SUMMARY OF THE PRESENT INVENTION

The present invention is directed to methods and apparatus for inputting data representing, e.g., a telephone number, into a computer system such as a telephone operator's workstation.

In accordance with one embodiment of the present invention, a telephone operator's workstation includes a display device, a keyboard, e.g., a standard personal computer keyboard, for inputting alphabetic information via a plurality of alphabetic keys and numeric information through a numeric keypad incorporated into the personal computer keyboard.

When a request is made for an operator assisted telephone call, the caller is connected to an operator working at, e.g., a telephone operator workstation. During an operator assisted telephone call, a number of different information fields are displayed on the operators display. The operator may enter data into various fields displayed on the workstations display device, e.g., a destination telephone number field.

In accordance with the present invention data fields are classified as to the type of information that can entered into the field, e.g., alphabetic, numeric, and alpha-numeric. In one particular embodiment alpha-numeric information can be entered into a telephone number field. However, when alphabetic information is entered into a telephone number field the workstation automatically converts the alphabetic information into numeric information. The generated numeric information is then used to, e.g., complete the call transaction.

In order to reduce the number of operator errors, the field into which an operator is inputting data is monitored, e.g., by the workstation. Thus, the data field into which data is being entered is detected. The type of data being entered is compared to the data type associated with the detected field. If there is a mismatch between the type of data being entered, the input data is rejected. In addition, an error message may be sent to the operator and/or the operator may be prompted for new information.

By permitting the telephone numbers to be entered as alphabetic or numeric data the burden on an operator to convert alphabetic information such as vanity numbers into numeric information is eliminated. This reduces the amount of time required to service a call involving vanity numbers. It also serves to reduce the number of errors associated with the entry of vanity numbers since the workstation performs the conversion from alphabetic characters to numbers and performs error checking as well.

DETAILED DESCRIPTION

The present invention is directed to methods and apparatus for allowing an operator to input data representing a telephone number, as either a series of numeric values, a character string, or an alpha-numeric string of data. By converting character string inputs into their corresponding telephone number keypad values, the present invention eliminates the need for an operator to translate alphabetic data into numeric data, in order to enter a telephone number. This reduces the amount of time required by an operator to service a call involving a vanity number while also reducing the number of operator errors associated with such calls.

Figure 1:
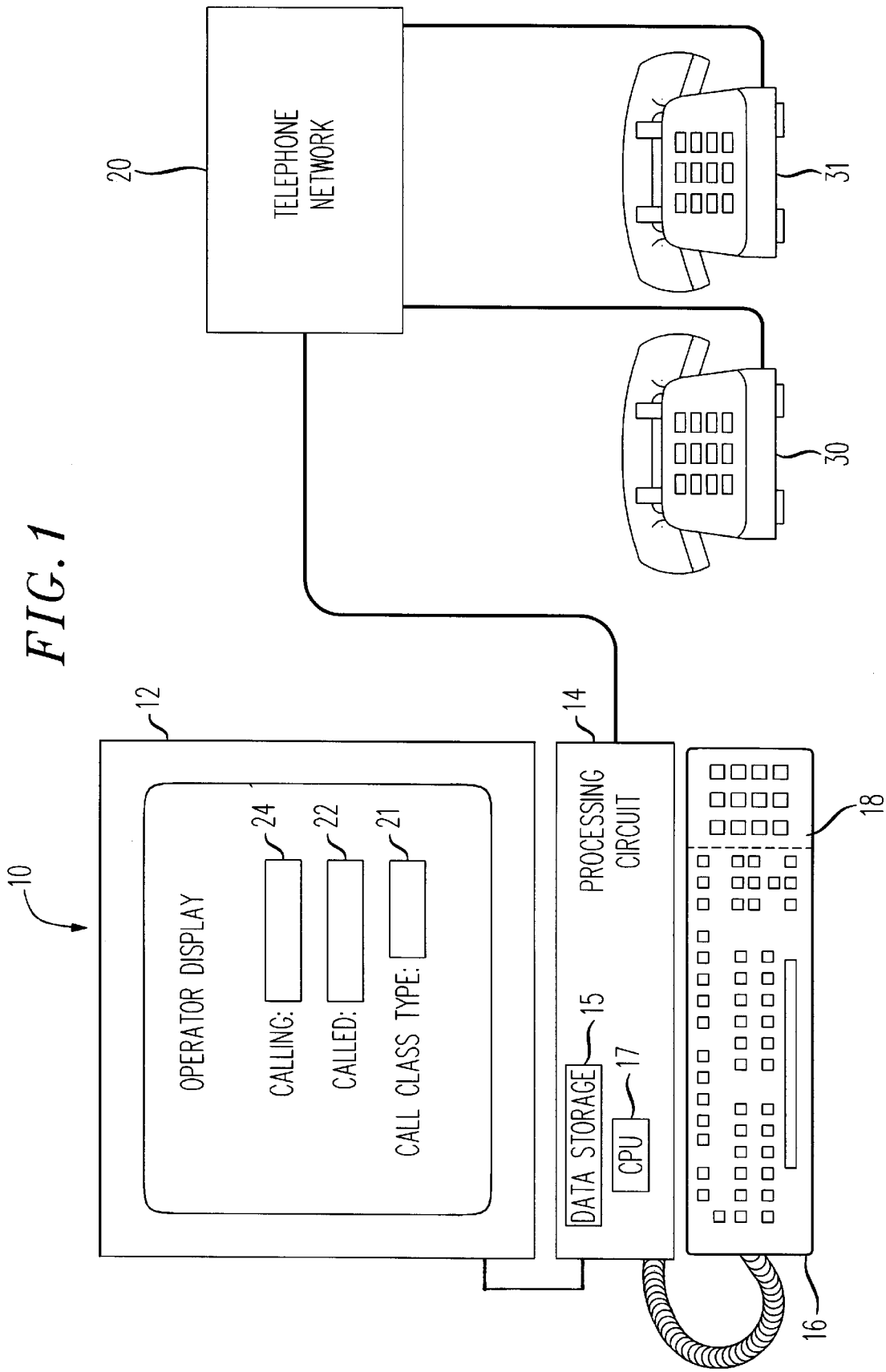
FIG. 1 is a diagram of an operator workstation suitable for implementing the method of the present invention.

FIG. 1 illustrates an operator workstation 10 suitable for implementing the present invention. The workstation 10 may be used by, e.g., a telephone operator, to service operator assisted telephone calls. As illustrated in FIG. 1, the operator workstation includes a display device 12, a processing circuit 14 and a standard computer keyboard 16 which includes a numeric keypad 18. The processing circuit 14 includes a data storage device 15 and a central processing unit 17. The central processing unit receives and sends data to and from a telephone network 20. It also controls the display of information on the display device 12. The numeric keypad 18 is used for inputting numeric data representing, e.g., a telephone number. Accordingly, the numeric keypad 18 serves as a telephone keypad.

The display device 12 is used to display a plurality of data fields, e.g., a calling field 24, a called field 22, and a call class type field 21. The destination telephone number can be displayed in the called data field 22 as a series of numeric and/or alphabetic characters.

The telephone network 20 to which the operator workstation 10 is coupled may include, e.g., digital switches and other electronics used for routing telephone calls to and from standard telephones such as telephones 30, 31.

Frequently, when seeking to place an operator assisted telephone call, a customer will call an operator using, e.g., the telephone 30. The operator assisted telephone call is directed by the telephone network to an operator working at a workstation 10.

Figure 2B:
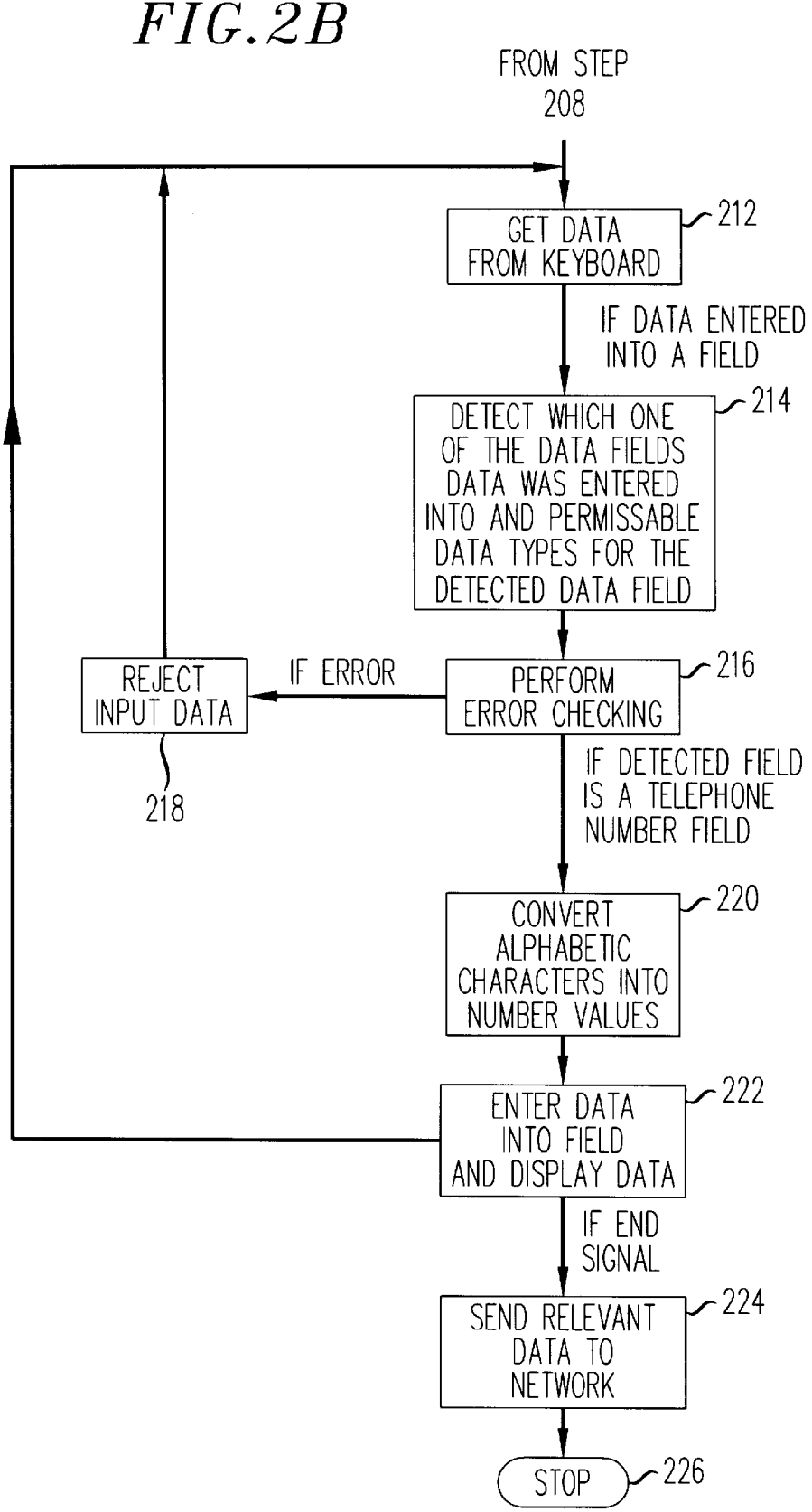
FIG. 2, which comprises the combination of FIGS. 2A and 2B, is a flow chart which is used to illustrate the steps involved in performing the method of the present invention.

The method of servicing a request for an operator assisted telephone call using the workstation 10, in accordance with one embodiment of the present invention, will now be described with regard to FIGS. 2A and 2B. The method of the present invention may be implemented using software to control the processing circuit 14.

Block 202 represents the start of the procedure associated with servicing an operator assisted telephone call. Block 204 represents the workstation receiving a request for an operator assisted call from the telephone network 20. Once such a request is received operation progress to step 206 where information on the call is displayed on the display 12. The displayed information includes, e.g., the telephone number from which the call originated. This information is displayed in the calling data field 24. The displayed information also includes information on the type of call, e.g., whether it is collect call. This information is displayed in the calling class type data field 21 on the display 12.

At this stage of the call, the called data field which represents the destination telephone number information will ordinarily be blank in the case of an operator assisted telephone call.

In order to service the call, the operator will at this point obtain information form the caller as indicated in step 208. This will frequently involve a caller orally stating the telephone number he wishes to call. The caller may state the telephone number as an actual number, e.g., 759 8355, as a string of alphabetic characters, or as a alphanumeric string. In response to the information provided by the caller to the operator, the operator will normally input data, such as the destination telephone number into the workstation 10. The workstation 10, and the CPU 17 in particular, monitor the operator input device 16 for input as indicated in step 212.

From step 212, operation progresses to step 214 where the workstation receives data from the operator input device 16. Upon receiving data, the processor circuit 14, under software control detects, i.e., determines, in step 214 into which one of the data fields 21, 22, 24 the operator input data. In addition, the processing circuit 14, under software control accesses the data storage device 15 to determine from databases stored therein what types of data may be entered into the detected field. The information thus obtained by accessing the data storage device 15 is then used in step 216 to perform error checking on the input data.

The error checking performed in step 216 involves comparing the data received in step 212 to the type of data which may be input into the detected field. For example, some data fields may only accept numeric information. In such a case alphabetic information would indicate erroneous input data. In the case of a telephone number field, such as the called field 22, in accordance with the present invention, an operator is allowed to input numbers, e.g., using the numeric keypad and/or alphabetic characters, e.g., using the alphabetic characters of the keyboard 16. In step 216, if the detected field is a telephone number field, entry of the letter Q and/or Z will result in an error condition being detected since these letters have no corresponding telephone number value on a standard telephone keypad.

What happens after error checking is performed in step 216 is a function of the result of that operation. If an error is detected, the input data is rejected in step 218. An error message may also be displayed and the operator may be prompted for new data. After the erroneous input data is rejected operation progress back to step 212.

If the detected field, i.e., the data input field, is a telephone number field and no error is detected in step 216, operation progresses to step 220 which is a conversion step.

In step 220, any alphabetic characters that were input are converted into their corresponding telephone number equivalent. The conversion process is performed automatically by the processing circuit 14 under software control without the need for operator intervention. As part of the conversion process, the CPU 14 may access a database stored in the data storage device 15 or elsewhere. The stored database may include the same as or similar information to that listed in TABLE I.

Once the conversion process is complete, the data which is now in numeric form, is entered and displayed on the display device 12 in the appropriate field, e.g., the called field 22. While in one embodiment only the numeric values are displayed in the called filed, in another embodiment both the alphabetic and numeric equivalent entered into the telephone number field are displayed to facilitate detection of typographical errors by the operator.

In step 222 if the received data includes an end or termination signal indicating, e.g., that the operator has provided sufficient information to complete the call transaction, operation progresses to step 224. In step 224 relevant data, e.g., the destination telephone number is sent to the network 20. At this point the involvement of the operator and the workstation 10 concludes as indicated by the STOP block 226.

By using a workstation in the above described manner, the need for an operator to convert a telephone number which is provided as a string of characters into a digital number to be entered by a standard keyboard is eliminated. In addition, the rate at which an operator can assist in completing a call to a vanity number is increased and the number of operator errors associated with servicing a call to a vanity number is reduced.

What is claimed is:

1. A method of processing a telephone call comprising the steps of:

providing a telephone operator telephone call related data from a caller;

the operator inputting into an operator workstation alphabetic characters representing a telephone number using alphabetic keys of a keyboard having more than 17 alphabetic keys, the keyboard being coupled to the operator workstation;

operating the operator workstation to convert the alphabetic characters representing a telephone number to corresponding numeric values ranging in value from two to nine by translating the alphabetic characters into corresponding numeric values; and utilizing the generated numeric values representing the telephone number to complete a call transaction.

2. The method of claim 1, further comprising the steps of:

inputting into the operator workstation numeric values representing at least a portion of the telephone number; and combining the generated numeric values with the input numeric values to generate a complete representation of a telephone number.

3. The method of claim 1, further comprising the step of:

checking the alphabetic characters representing a telephone number to detect errors, the step of checking including the step of:

rejecting alphabetic characters Q and Z.

4. The method of claim 2, further comprising the step of:

checking the alphabetic characters representing a telephone number to detect errors, the step of checking including the step of:

rejecting alphabetic characters Q and Z.

5. The method of claim 1, further comprising the steps of:

displaying a plurality of data fields on a display device;

monitoring the keyboard for the input of data;

detecting which one of the displayed data fields data is entered into; and checking data received from the input devices to insure that the input data is of a type which can be entered into the detected data field.

6. The method of claim 5, further comprising the step of:

rejecting input data of a type that differs from the data type that can be entered into the detected data field.

7. The method of claim 6, further comprising the step of:

displaying an error message when input data is rejected.

8. The method of claim 7, further comprising the step of:

displaying the alphabetic characters representing the telephone number; and displaying the generated numeric values representing the telephone number.

9. The method of claim 8, further comprising the step of:

sending the generated numeric values representing the telephone number to a telephone network to complete a call transaction.

10. The method of claim 1, further comprising the step of:

displaying the alphabetic characters representing the telephone number; and displaying the generated numeric values representing the telephone number.

11. The method of claim 10, further comprising the steps of:

inputting into the operator workstation numeric values representing at least a portion of the telephone number using a keypad having 16 or fewer keys; and combining the generated numeric values with the input numeric values to generate a complete representation of a telephone number.

12. The method of claim 5, wherein the step of displaying a plurality of data entry fields includes the steps of:

displaying a called party data entry field; and displaying a call class charge type data entry field.

13. The method of claim 2, wherein the step of inputting into the operator workstation alphabetic characters includes the step of:

using keys of the keyboard which are designated as corresponding only to alphabetic characters.

14. The method of claim 13, wherein the step of inputting into the operator workstation numeric values includes the step of:

using keys of the keyboard designated as corresponding to numeric values.

15. The method of claim 14, wherein the step of providing a telephone operator telephone call related data includes the step of:

providing the telephone operator oral information provided by a caller.

16. The method of claim 15, further comprising the step of:

rejecting the input of alphabetic characters Q and Z.

17. The method of claim 16, further comprising the step of:

displaying on a computer screen the numeric values generated from the alphabetic characters.

18. The method of claim 17, further comprising the step of:

displaying a plurality of data entry fields on the computer screen;

monitoring which one of the displayed fields the telephone operator is inputting data; and converting input from keys designated as corresponding only to alphabetic characters when the telephone operator is inputting data into a numeric data field.

19. The method of claim 18, wherein the step of displaying a plurality of data entry fields includes the steps of:

displaying a called party data entry field;

displaying a call class charge type data entry field; and wherein the step of providing the telephone operator oral information provided by a caller includes the steps of:

coupling the operator workstation to a telephone used by the caller via a telephone switching network.

20. A method of processing a telephone call comprising the steps of:

coupling a telephone to a telephone operator workstation using a telephone network;

providing a telephone operator oral telephone call related data obtained from a caller using the telephone;

inputting into an operator workstation at least some alphabetic telephone number information, the inputting being performed by the telephone operator using keys, each of which corresponds to no more than one letter of the alphabet, the used keys being part of a physical keyboard attached to the operator workstation, the keyboard having more than 17 keys designated as alphabetic keys;

operating the operator workstation to generate from alphabetic telephone number information input using the keys corresponding to no more than one letter of the alphabet, corresponding numeric values ranging in value from two to nine by translating the alphabetic telephone number information into corresponding numeric values, the generated numeric values representing at least part of a telephone number; and utilizing the generated numeric values to complete a call transaction.

21. The method of claim 20, further comprising the steps of:

displaying a telephone number field; and rejecting the input of the alphabetic character Q into the telephone number field.

22. A method of processing a telephone call comprising the steps of:

coupling a telephone to a telephone operator workstation using a telephone network;

providing a telephone operator oral telephone call related data obtained from a caller using the telephone;

inputting into an operator workstation at least some alphabetic telephone number information included in the oral telephone call related data provided to the telephone operator, the inputting being performed by the telephone operator using a plurality of keys which are part of a physical keyboard, coupled to the operator workstation, having more than 17 keys, each of the plurality of used keys corresponding to a single letter of the alphabet;

operating the operator workstation to generate from alphabetic characters input using the keys corresponding to a single letter of the alphabet, corresponding numeric values ranging in value from two to nine by translating the alphabetic characters into corresponding numeric values, the generated numeric values representing at least a part of a telephone number; and utilizing the generated numeric values representing at least a part of a telephone number to complete a call transaction.

* * * * *